Nov. 12, 1946.  A. P. LIEN ET AL  2,410,886
ALUMINUM CHLORIDE CONVERSION SYSTEM
Filed Dec. 15, 1941
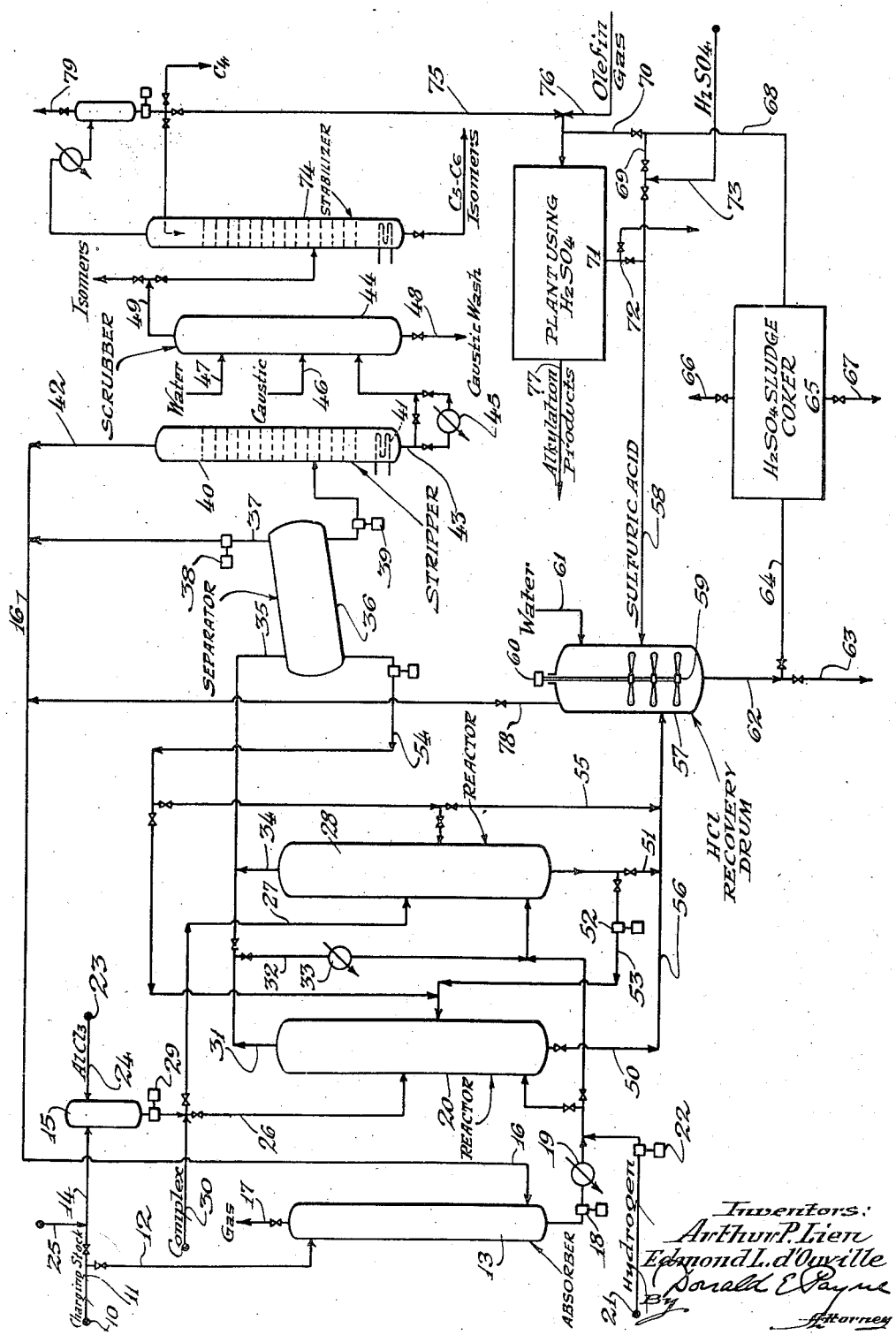

Patented Nov. 12, 1946

2,410,886

UNITED STATES PATENT OFFICE 2,410,886

ALUMINUM CHLORIDE CONVERSION SYSTEM

Arthur P. Lien, Whiting, Ind., and Edmond L. d'Ouville, Chicago, Ill., assignors to Standard Oil Company, Chicago, Ill., a corporation of Indiana Application December 15, 1941, Serial No. 422,985

14 Claims. (Cl. 260—683.5)

This invention relates to an aluminum chloride conversion system and it pertains more particularly to a system requiring the use of an hydrogen chloride promoter.

Aluminum chloride has long been known as a catalyst for effecting various hydrocarbon conversion processes such as cracking, polymerization, alkylation, etc. A very important aluminum chloride conversion process is that of isomerizing paraffinic hydrocarbons, particularly in the butane to hexane boiling range, for the preparation of aviation fuel blending stocks of high octane number. Our invention is particularly applicable to this aluminum chloride isomerization process and it will be described in connection therewith.

In the aluminum chloride isomerization process a charging stock, preferably paraffinic hydrocarbons of the $C_4$—$C_6$ boiling range, is contacted with an aluminum chloride catalyst in complex form and it is essential that the isomerization be effected in the presence of an activator such as hydrogen chloride. In the course of the conversion the catalyst gradually loses its activity, although catalyst life may be greatly prolonged by the use of hydrogen pressures in combination with the hydrogen chloride activator. The catalyst complex which has lost its activity is a sludge, the disposal of which has heretofore constituted a serious problem, both because of the physical nature of the material and because its contact with water produces a highly corrosive mixture. An object of our invention is to provide a new and improved method and means for disposing of such sludge or catalyst complex.

In the isomerization reaction it is essential to introduce hydrogen chloride into the reaction zone in an amount within the approximate range of 2% to 10% by weight based on stock charged. Most of this hydrogen chloride can be separated from reaction products, recycled to an absorber and recovered for reuse but some of the hydrogen chloride is inevitably consumed in the reaction or lost from the conversion system and it is, therefore, necessary to provide make-up hydrogen chloride. An object of our invention is to provide a new and improved method and means for supplying make-up hydrogen chloride to the conversion system.

Many oil refineries employ processes requiring the use of sulfuric acid and in these processes, spent acids or acid sludges are produced. Such spent acids or acid sludges have been charged to conventional sludge coker systems in order to recover the sulfuric acid for reuse. An object of our invention is to utilize such spent acids or acid sludges for treating the aluminum chloride sludge produced in the aluminum chloride conversion process. Other objects will be apparent as the detailed description of our invention proceeds.

When spent aluminum chloride complex or sludge is hydrolyzed with water the corrosiveness and physical nature of the hydrolyzed sludge make its disposal problem extremely troublesome and expensive. Furthermore, the amount of recoverable anhydrous hydrogen chloride that is obtainable by water hydrolysis is quite small, usually within the range of from about ½ to ¾ of a mol of hydrogen chloride per mol of aluminum chloride in the spent sludge. We have discovered that by using sulfuric acid instead of water as a hydrolyzing agent we may obtain from 2 to 3 times as much anhydrous hydrogen chloride as can possibly be obtained by the use of water or steam as a hydrolyzing agent. We have discovered that even at hydrolyzing temperatures upwards of 200° F. no sulfur dioxide is evolved in this reaction and we have found that the resulting acid sludge is very easily handled. Such acid sludge may be charged to a conventional sludge coker in order to recover the sulfuric acid for reuse.

The isobutane produced by the isomerization reaction or from any other source may be alkylated with sulfuric acid for the production of high knock rating motor fuels such as isooctane. The spent sulfuric acid from this alkylation plant may then be reacted with the spent aluminum chloride sludge from the isomerization system before it is charged to the sludge coker for sulfuric acid recovery. Alkylation acid is only one example of by-product acids and acid sludges which are produced by refinery utilization of sulfuric acid and our invention contemplates the use of any such acids or acid sludges for the generation of anhydrous hydrogen chloride from spent aluminum chloride complex or sludge.

While our invention is primarily directed to the use of aluminum chloride and hydrogen chloride it should be understood that it is equally applicable to other metal halides and hydrogen halides such as iron chloride, aluminum bromide, hydrogen bromide, etc.

The sulfuric acid concentration for our process may vary throughout a relatively wide range but should usually be within the approximate range of 50% to 100% concentration. The temperature of the sulfuric acid-aluminum chloride sludge treating step may likewise vary throughout a wide range but will usually be between 20° and 250° F. at atmospheric pressure. Our invention is not limited to the use of atmospheric pressure and the pressure in this treating step may range from about 1 to 30 atmospheres. In a specific example which will be hereinafter described in further detail we treat a spent aluminum chloride complex with an excess of sulfuric acid of 75% concentration at atmospheric pressure and at a temperature of about 200° F., the sulfuric acid being slowly added to the spent complex with continuous stirring. Instead of adding acid to complex we may add complex to acid or we may simultaneously introduce both complex and acid into a hydrogen chloride recovery drum.

Important advantages of our process are:

(1) The generated hydrogen chloride is anhydrous;

(2) The amount of hydrogen chloride obtainable is two or three times as much as that obtainable by prior processes;

(3) The reaction products are less corrosive to metal than has been the case in prior processes.

The second advantage is particularly important because it may enable the continuous operation of the isomerization plant without the necessity of supplying make-up hydrogen chloride from outside sources.

Our invention will be more clearly understood from the following detailed description read in conjunction with the accompanying drawing which forms a part of this specification and which is a schematic flow diagram of our improved isomerization and hydrogen chloride recovery system.

Referring to the drawing, charging stock from source 10 is introduced under pressure through line 11, the major part of the stream passing by line 12 to the top of absorber 13 and a minor portion of the charging stock (if desired) passing by line 14 to aluminum chloride mixing tank 15. Our preferred charging stock is a light paraffinic naphtha having an end point or at least a 95% point not substantially higher than 180° F. The stock should be substantially free from heptanes, i. e., should not contain as much as 10% heptanes and should preferably contain less than 5%. The charging stock should be substantially free from olefins and it is desirable that it contain less than 5% and preferably less than 2% of aromatics. A light paraffinic naphtha of about 150° end point is particularly suitable since it consists essentially of $C_5$ and $C_6$ hydrocarbons. The charging stock may, of course, be obtained from casing head gases or from the so-called Fischer naphtha resulting from carbon monoxide-hydrogen synthesis or from any other source.

Absorber 13 may operate under a pressure ranging from about 30 to 300 pounds per square inch, for example, at about 200 to 250 pounds per square inch and it is preferably maintained at a temperature of the order of 50 to 150° F. Gases containing hydrogen chloride are introduced at the base of this absorber through line 16 and unabsorbed methane, etc. are removed from the top of the absorber through line 17. The charging stock solution which contains about 2% to 10% by weight of hydrogen chloride is then pumped by pump 18 through heater 19 to the base of reactor 20. Hydrogen from source 21 may be introduced into this stream by compressor 22 at the rate of about 100 to 300 cubic feet (measured at standard conditions) per barrel of stock charged.

Make-up aluminum chloride is introduced from source 23 into mixer 15 by any suitable feeding means 24. The make-up aluminum chloride may be slurried with a part of the charging stock or dissolved in a part of the charging stock at high temperature and pressure or dissolved or slurried with an extraneous liquid introduced through line 25 or otherwise incorporated into a carrier vehicle for introduction either through line 26 to reactor 20 or through line 27 to reactor 28. A pump 29 may be employed where the mixer, slurry, or solution tank 15 is at a pressure lower than the reactor pressure. Make-up aluminum chloride is supplied in amounts ranging from about .1 to 4 pounds of aluminum chloride per barrel of total stock charged to the reactor.

The actual catalyst in reactor 20 is an aluminum chloride hydrocarbon complex which may be formed in situ or which may be pre-formed and then introduced into the reactor through line 30. The reactor contains a relatively large volume of such complex, the space velocity therein being approximately .2 to 4 volumes of charging stock (liquid phase) per hour per volume of catalyst complex in the reactor. The temperature in the reactor is within the approximate range of 200 to 350° F. and the pressure is within the approximate range of 500 to 1500 pounds per square inch.

While reactor 20 is on-stream reactor 28 may be standing by for catalyst withdrawal or catalyst replacement and vice versa. Alternatively we may operate the reaction chambers either in series or in parallel and in a continuous manner. A preferred method of operation is to remove products and gases from the top of reactor 20 through line 31 and then pass them through line 32 and cooler 33 to the base of reactor 28. Products leaving the top of reactor 28 through line 34 (and/or products from line 31) are introduced by line 35 to separator 36. Instead of a single separator we may employ a plurality of separators, one being relatively warm and at reaction pressure and another being relatively cool and at low pressure. Gases are removed from the top of at least one of these separators through line 37 and if necessary are compressed by compressor 38 in order that they may be recycled by line 16 to the base of absorber 13.

Liquid products from separator 36 are introduced by pump 39 to stripper 40 which is provided with a suitable heater 41 at its base. The stripper is operated at such conditions of temperature and pressure as to remove substantially all of the hydrogen chloride from the products, the removed hydrogen chloride being returned by line 42 to line 16, a compressor being employed if the stripper operates at a lower pressure than the absorber.

Products from the base of stripper 40 pass through line 43 directly to scrubber 44 or, if desired, may pass to the scrubber through cooler 45. The products are neutralized by caustic introduced through line 46 and are then washed by water introduced through line 47. The caustic wash liquid is withdrawn through line 48 and the isomerization products are withdrawn through line 49 for subsequent utilization, stabilization or fractionation. The products may contain substantial amounts of isobutane and the recovered isobutane may be charged to a sulfuric acid alkylation process as will be hereinafter described. The isomerization products are characterized by a very high octane number and with $C_6$ hydrocarbon charging stock are characterized by a substantial content of neohexane.

After the isomerization reaction has proceeded for one or two weeks or more the activity of the catalyst complex may decrease to such an extent that it must be withdrawn and replaced by more active material. Thus spent catalyst complex or sludge may be withdrawn from reactor 20 through line 50 and spent complex or sludge may be withdrawn from reactor 28 through line 51. When the reactors are operating in series the make-up catalyst is introduced to reactor 28 through line 27 and the complex from the base of reactor 28 for passage by pump 52 and line 53 to reactor 20. Alternatively, catalyst may be continuously or intermittently introduced into both reactors through lines 26 and 27 and relatively spent catalyst may be withdrawn through lines 50 and 51.

Catalyst from separator 36 may be returned by line 54 to reactor 28 (or reactor 20). This separated catalyst material from line 54 may likewise be employed as a vehicle for introducing make-up aluminum chloride into the system. Still again it may be withdrawn from the isomerization system through line 55. It will be understood, of course, that suitable pumps may be employed in line 54 where the separator is at a lower pressure than the element to which the separated catalyst is returned.

In accordance with our invention the spent complex or catalyst material from lines 50 and 51 and 55 are introduced by line 56 into a hydrogen chloride recovery drum 57. Prior to introducing this spent sludge or catalyst material into the recovery drum we may treat the spent sludge with chlorine, hydrogen chloride, hydrogen or a mixture thereof at such temperatures and pressures as to effect the recovery of valuable hydrocarbons therefrom. Alternatively, or in addition to this hydrocarbon recovery step, we may extract the sludge or catalyst material with butane or naphtha or a portion of the charging stock at a sufficiently high temperature for dissolving out any uncombined aluminum chloride that may be present in the sludge or catalyst material. If these pretreating steps are employed it is the final sludge which is introduced into recovery drum 57.

Sulfuric acid is introduced into the recovery drum through line 58. The concentration of the sulfuric acid is preferably about 50 to 100% and it may either be a fresh acid or by-product acid from some other refinery step. The recovery drum may be provided with a suitable stirrer 59 driven by motor 60. We may either add acid to a body of spent sludge in the recovery drum or we may add sludge to a body of acid material in said drum or we may simultaneously add the acid and sludge thereto. The quantity of acid may be limited to the amount required for driving over the available hydrogen chloride and water may subsequently be added through line 61 to facilitate the removal of the residual sludgy material in the fluid state through line 62 and line 63. In order to prevent settling out of essential insoluble hydrocarbon tar, the water must be added while the reaction mixture is still hot. The heat generated by the original reaction of aluminum chloride complex with sulfuric acid is sufficient for this purpose. The liquid product withdrawn through line 63 may be conveniently washed down a sewer or otherwise disposed of.

A preferred method of operation is to employ a large excess of sulfuric acid, i. e., much more than is required to drive over the available hydrogen chloride in the spent complex or aluminum chloride sludge. This excess of sulfuric acid brings the reaction mixture into a fluid feed, i. e., forms a mixture which can be readily and easily removed from the reactor and charged by line 64 to a conventional sludge coker 65 for the recovery of sulfuric acid.

From the sludge coker gases are vented through line 66, solids are withdrawn through vent 67 and sulfuric acid is returned by lines 68, 69 and 58 to recovery drum 57. Where sulfuric acid is utilized in some other refinery process such as alkylation, acid treating, polymerization, etc., the recovered sulfuric acid may be passed through line 70 to this refinery utilization process 71 and at least a portion of the spent acid from this utilization process may be returned to drum 57 through lines 72 and 58. Make-up sulfuric acid may be supplied from source 73.

Where system 71 is an alkylation system, isobutane may be separated from isomerization products in stabilizer 74 and passed through line 75 into the alkylation system 71 together with olefin gases introduced through line 76. The alkylation products such as isooctane may be withdrawn through line 77 and the alkylation acid introduced into recovery drum 57 as hereinabove described.

The hydrogen chloride generated in recovery drum 57 is returned by line 78 to line 16 for introduction into the base of absorber 13. If drum 57 operates at a lower pressure than absorber 13 a compressor will, of course, have to be employed in line 78 or the HCl may be dissolved in at least a portion of the hydrocarbon feed at relatively low pressure say one or two atmospheres before said hydrocarbon is introduced into absorber 13. Any hydrocarbon gases that may be discharged with the hydrogen chloride from the top of drum 57 may be pumped from the system either through line 17 or from a final product stabilizer vent line 79.

The remarkably large amounts of hydrogen chloride which are recoverable by our process are in most instances sufficient to make up any losses and compensate for any hydrogen chloride consumption in the isomerization system. Thus in addition to solving the sludge disposal problem we have simultaneously solved the vexatious problem of supplying make-up hydrogen chloride to the isomerization system.

While we have described in detail a specific example of our invention, it should be understood that the invention is not limited to this particular example nor to the particular arrangement of apparatus nor operating conditions recited therein since many other modifications and alternatives will be apparent to those skilled in the art from the above description. For example, the reactor itself may serve as the hydrogen chloride recovery drum while it is off-stream thus eliminating the necessity of a separate recovery drum. Where more hydrogen chloride is recovered than is recycled in the isomerization process it may, of course, be liquefied or absorbed in water or other solvent for various commercial uses or it may be utilized in the refinery for other purposes.

We claim:

1. In an aluminum chloride conversion process for isomerizing paraffinic hydrocarbons of the butane to hexane boiling range, the method of operation which comprises absorbing hydrogen chloride in charging stock, contacting said charging stock together with absorbed hydrogen chloride with an aluminum chloride-hydrocarbon complex under conditions for effecting isomerization of said charging stock, separating hydrogen chloride from the isomerization products and returning said hydrogen chloride to said absorption step, treating complex from said contacting step with sulfuric acid the concentration of which is within the approximate range of about 50% to 100% for the recovery of anhydrous chloride therefrom and introducing said recovered hydrogen chloride to said absorption step.

2. The method of making blending stocks for high knock rating aviation fuels which method comprises isomerizing paraffinic $C_5$ and $C_6$ hydrocarbons with an aluminum chloride catalyst for the production of high knock rating $C_5$ and $C_6$ hydrocarbons, isobutane, and aluminum chloride sludge, alkylating said isobutane with an olefin gas by means of sulfuric acid to produce another high knock rating motor fuel component and an alkylation acid, treating said aluminum chloride sludge with said alkylation acid the concentration of which is within the approximate range of about 50% to about 100% to produce anhydrous hydrogen chloride and utilizing said anhydrous hydrogen chloride in said isomerization step.

3. The method of reducing hydrogen chloride requirements in a process for effecting isomerization of paraffinic hydrocarbons boiling in the butane to hexane boiling range with an aluminum chloride catalyst promoted by hydrogen chloride wherein an aluminum chloride hydrocarbon sludge is formed and separated from hydrocarbons, which method comprises treating said separated sludge with sulfuric acid the concentration of which is within the approximate range of 50% to 100% and the amount of which is sufficient to liberate substantially more hydrogen chloride than could be liberated by hydrolysis with water, and returning said liberated hydrogen chloride to said hydrocarbon isomerization process.

4. The method of claim 3 wherein the sulfuric acid is one which has previously been contacted with hydrocarbons.

5. The method of claim 3 which includes the steps of effecting the isomerization process under conditions for producing isoparaffin hydrocarbons, alkylating at least a part of the isoparaffin hydrocarbons with an added olefin hydrocarbon by means of concentrated sulfuric acid, and using the sulfuric acid from the alkylation step for treating said sludge.

6. A hydrocarbon conversion process which comprises absorbing hydrogen chloride in a paraffinic hydrocarbon charging stock boiling in the butane to hexane boiling range, effecting said absorption at a pressure in the general vicinity of 30 to 300 pounds per square inch, contacting the solution produced in the absorption step with an aluminum chloride catalyst under conditions for effecting the production of isomerized hydrocarbon products and an aluminum chloride-hydrocarbon sludge, separating said sludge from hydrocarbons, treating said separated sludge with an amount of sulfuric acid of about 50% to 100% concentration sufficient to liberate a substantial amount of hydrogen chloride therefrom, effecting said treating at a pressure at least as high as the pressure employed in the absorbing step, and introducing hydrogen chloride from the treating step into the absorbing step.

7. The method of simultaneously utilizing a sulfuric acid of about 50% to 100% concentration which has become at least partially spent in hydrocarbon refinery operations and an aluminum chloride hydrocarbon sludge produced in a process of isomerizing a paraffinic hydrocarbon boiling in the butane to hexane boiling range with an aluminum chloride catalyst material, which method comprises intimately mixing said acid and sludge under conditions of temperature and pressure to effect liberation of anhydrous hydrogen chloride without the production of any substantial amount of sulfur dioxide.

8. In an isomerization process wherein the isomerization of a paraffinic hydrocarbon boiling in the butane to hexane boiling range is continuously effected in an isomerization zone in the presence of an aluminum chloride catalyst material promoted with hydrogen chloride, wherein hydrogen chloride is separated from a hydrocarbon product stream discharged from the isomerization zone and is recycled to said isomerization zone and wherein an aluminum chloride hydrocarbon complex is formed during the isomerization reaction, the improvement which comprises treating said complex at a temperature within the approximate range of 32° F. to 200° F. with a sufficient amount of sulfuric acid of a strength within the range of about 90% to about 99% to effect reaction with said complex and production of additional hydrogen chloride and combining said additional hydrogen chloride with hydrogen chloride which is separated from hydrocarbons discharged from the isomerization zone and recycled to said isomerization zone.

9. In an aluminum chloride conversion process for isomerizing paraffinic hydrocarbons boiling in the butane to hexane boiling range, the method of operation which comprises continuously introducing a charging stock of said hydrocarbons into a reaction zone, contacting said charging stock in said zone in the presence of hydrogen chloride with an aluminum chloride isomerization catalyst under conditions for effecting isomerization of said charging stock and the formation of aluminum chloride-hydrocarbon complex material, separating hydrogen chloride from the hydrocarbon isomerization products and recycling the separated hydrogen chloride to said reaction zone, treating complex produced in the reaction zone with sulfuric acid of a strength within the range of about 90% to about 99% under conditions for producing additional hydrogen chloride and introducing said additional hydrogen chloride to said reaction zone with said recycled hydrogen chloride.

10. A process for isomerizing paraffinic hydrocarbons boiling within the butane to hexane boiling range which comprises passing a stream of said hydrocarbons under isomerization conditions in contact with a body of aluminum chloride catalyst in the presence of hydrogen chloride until said catalyst converted into sludge, thereafter contacting at least a part of said sludge with an amount of sulfuric acid of 50% to 100% strength to generate hydrogen chloride, employing a sufficient amount of sulfuric acid to effect liberation of substantially all available hydrogen chloride in the sludge and returning the liberated hydrogen chloride to said stream of hydrocarbons.

11. In a hydrocarbon conversion process wherein paraffinic hydrocarbons boiling in the butane to hexane boiling range are contacted with an aluminum chloride catalyst and added hydrogen chloride in a contacting zone under conversion conditions and wherein an aluminum chloride-hydrocarbon complex is thereby obtained, the method of operation which comprises withdrawing said complex from said contacting zone to a treating zone, treating said complex in said treating zone with an amount of 50% to 100% sulfuric acid sufficient to liberate a large amount of hydrogen chloride therefrom and introducing said liberated hydrogen chloride into said contacting zone.

12. In a hydrocarbon conversion process wherein paraffinic hydrocarbons boiling in the butane to hexane boiling range are continuously contacted in a reaction zone with an aluminum chloride catalyst promoted with hydrogen chloride under conversion conditions whereby aluminum chloride-hydrocarbon complex is produced, the improvement which comprises introducing complex from said reaction zone into a contacting zone, treating said complex in said contacting zone with an amount of sulfuric acid of a strength within the range of about 90% to about 100% sufficient to react with the aluminum chloride content of said complex and to produce hydrogen chloride, separating from hydrocarbons discharged from the reaction zone the hydrogen chloride associated therewith and recycling separated hydrogen chloride together with produced hydrogen chloride back to said reaction zone.

13. In a hydrocarbon conversion process wherein paraffinic hydrocarbons boiling within the butane to hexane boiling range are continuously contacted in a reaction zone with an aluminum chloride catalyst promoted by hydrogen chloride under conditions for effecting hydrocarbon conversion and for producing an aluminum chloride-hydrocarbon complex, wherein hydrogen chloride is separated from hydrocarbons discharged from the reaction zone and is recycled to the reaction zone and wherein an aluminum chloride-hydrocarbon complex is withdrawn from said reaction zone the improvement which comprises introducing said complex from said reaction zone into a contacting zone, treating said complex in said contacting zone at a temperature within the range of about 32° F. to 200° F. with a sufficient amount of sulfuric acid of a strength within the range of about 90% to about 100% to effect reaction of the aluminum chloride content of said complex and the production of additional hydrogen chloride, and combining said additional hydrogen chloride with the hydrogen chloride which is separated from hydrocarbons and recycled to the reaction zone.

14. In an aluminum chloride conversion process for isomerizing paraffinic hydrocarbons boiling within the butane to hexane boiling range the method of operation which comprises continuously introducing said hydrocarbons into a reaction zone, contacting said hydrocarbons in said reaction zone in the presence of hydrogen chloride with an aluminum chloride isomerization catalyst under conditions for effecting isomerization of said hydrocarbons whereby an aluminum chloride-hydrocarbon complex is produced, withdrawing complex from said reaction zone, treating said withdrawn complex with sulfuric acid of about 50% to 100% strength under conditions for producing additional hydrogen chloride and introducing said additional hydrogen chloride to said reaction zone along with hydrogen chloride separated from the hydrocarbon isomerization products.

ARTHUR P. LIEN.
EDMOND L. D'OUVILLE.